United States Patent
Lenk

(10) Patent No.: US 10,143,052 B2
(45) Date of Patent: *Nov. 27, 2018

(54) LIGHT EMITTING DIODE (LED) WARM ON DIM CIRCUIT

(71) Applicant: LuxTech, LLC, Philadelphia, PA (US)

(72) Inventor: Ronald J. Lenk, Marietta, GA (US)

(73) Assignee: LuxTech, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,285

(22) Filed: Sep. 18, 2017

(65) Prior Publication Data
US 2018/0007757 A1    Jan. 4, 2018

Related U.S. Application Data

(63) Continuation of application No. 15/085,001, filed on Mar. 30, 2016, now Pat. No. 9,769,895.

(60) Provisional application No. 62/140,997, filed on Mar. 31, 2015.

(51) Int. Cl.
*H05B 33/08*    (2006.01)

(52) U.S. Cl.
CPC ....... *H05B 33/0845* (2013.01); *H05B 33/086* (2013.01); *H05B 33/0812* (2013.01); *H05B 33/0815* (2013.01); *H05B 33/0857* (2013.01); *Y02B 20/345* (2013.01); *Y02B 20/347* (2013.01); *Y02B 20/348* (2013.01)

(58) Field of Classification Search
CPC ............ H05B 33/0824; H05B 33/0812; H05B 33/0815; H05B 33/0854; H05B 33/0821; H05B 33/0842; H05B 33/0845; H05B 33/0857; H05B 33/086; H05B 33/0803; Y02B 20/345; Y02B 20/346; Y02B 20/347

See application file for complete search history.

(56) References Cited

U.S. PATENT DOCUMENTS

| | | | |
|---|---|---|---|
| 6,683,419 B2 | 1/2004 | Kriparos | |
| 7,317,403 B2 | 1/2008 | Grootes | |
| 7,986,100 B2 | 7/2011 | Chung | |
| 8,111,009 B2 | 2/2012 | Tsai et al. | |
| 8,242,711 B2 | 8/2012 | Summerland | |
| 8,456,109 B1 | 6/2013 | Wray | |
| 8,766,550 B1 | 7/2014 | Yoon et al. | |
| 9,155,150 B2 | 10/2015 | Heeringa | |
| 9,198,256 B2 | 11/2015 | Chen | |
| 9,510,418 B2 * | 11/2016 | Bhagwat | H05B 33/0815 |

(Continued)

FOREIGN PATENT DOCUMENTS

WO    WO 2013/052605    4/2013

OTHER PUBLICATIONS

International Search Report and Written Opinion for International Application PCT/US2016/024701, dated Jun. 24, 2016.

*Primary Examiner* — Haissa Philogene
(74) *Attorney, Agent, or Firm* — Cooley LLP

(57) ABSTRACT

A method and circuit to use light-emitting diodes to emulate the dimming performance of incandescent lighting, and more particularly, to making a circuit that uses only white and deep red light-emitting diodes to achieve a coordinated-color-temperature as a function of dim level that is close to that of an incandescent light being similarly dimmed.

20 Claims, 4 Drawing Sheets

(56) References Cited

U.S. PATENT DOCUMENTS

| | | |
|---|---|---|
| 9,769,895 B2 * | 9/2017 | Lenk .................... H05B 33/086 |
| 9,877,361 B2 * | 1/2018 | Williams ............... H05B 33/08 |
| 2011/0285301 A1 | 11/2011 | Kuang et al. |
| 2011/0291585 A1 | 12/2011 | Foo |
| 2012/0019714 A1 | 1/2012 | Hiramatu et al. |
| 2014/0197754 A1 | 7/2014 | Wray |
| 2014/0312787 A1 | 10/2014 | Van Den Broeke |
| 2015/0042234 A1 | 2/2015 | Lee et al. |

* cited by examiner

LIGHT EMITTING DIODE (LED) WARM ON DIM CIRCUIT

CROSS-REFERENCE TO RELATED APPLICATIONS

This application is a continuation of U.S. patent application Ser. No. 15/085,001, entitled "LIGHT EMITTING DIODE (LED) WARM ON DIM CIRCUIT," filed on Mar. 30, 2016, which claims priority to and the benefit of U.S. Provisional Patent Application No. 62/140,997, entitled "LIGHT EMITTING DIODE (LED) WARM ON DIM CIRCUIT," filed on Mar. 31, 2015, which is incorporated herein by reference in its entirety.

FIELD

The disclosure relates to providing a method and circuit to use light-emitting diodes (LEDs) to emulate the dimming performance of incandescent lighting, and more particularly, to making a circuit that uses only white and deep red LEDs to achieve a coordinated-color-temperature (CCT) as a function of dim level that is close to that of an incandescent light being similarly dimmed.

BACKGROUND

It is frequently desirable to dim lights. Dimmers are found in many residential and commercial locations. This dimming has been done historically by removing power from the light during a certain portion of each line cycle, as is accomplished using a triac dimmer. However, it is becoming increasingly common for the dimming level to be set by a DC signal, typically 0-10V.

Traditionally, dimmers have been used with incandescent light bulbs. These bulbs have very particular characteristics as they dim. Not only does the light they produce get dimmer, it also becomes redder, so-called 'warm-on-dim'. One measure of the change in color of the light is the CCT. The CCT of a light is measured by finding the closest black-body radiation emission temperature of the light, and so is measured in degrees Kelvin (K). A typical incandescent light bulb, as it is dimmed, changes from about 2800K to about 1800-2000K. The relationship between dim level, measured by average voltage applied over a line cycle, and CCT is highly non-linear.

An increasingly common form of lighting is the LED. These work by applying a DC current through them. The amount of light they emit is approximately proportional to the magnitude of the current. It is thus common to dim LEDs by controlling their current as a function of the dim level, which is determined by either the average or RMS voltage, or by the DC 0-10V signal.

However, a problem arises when dimming LED lights. A particularly common form of LED is the so-called 'white' LED. These can be designed to have a CCT anywhere along the black-body curve, from 6000K down to below 2500K. However, for a given LED their CCT is basically not adjustable. When the current through them is reduced, they produce less light, but the CCT is unaffected. White LEDs thus do not produce the same type of light output on a dimmer as does an incandescent light bulb.

The typical method of solution to this problem in an LED light is to use a variety of different colored LEDs, such as a combination of red, green and blue (RGB), and to mix their light emissions together optically. The amount of current in each may be designed to produce white light of a particular CCT, for example that of an incandescent bulb at full brightness. When used with a dimmer, the ratios of currents in the different colors is varied in such a way as to produce a desired arbitrary CCT, and in particular, one that is close to that of an incandescent being similarly dimmed.

However, generating and controlling the currents appropriately to the three colors of LEDs typically involves considerable circuitry, and frequently is done under software control of a microcontroller that is built in to the light. This level of complexity makes such a control expensive and large. Furthermore, the type of red LED used to achieve this performance has a very significant change in light output as a function of its temperature, even at constant current drive level. To compensate for this, the microcontroller will typically also sense the temperature of the light, applying corrections to the amount of current received by the red LED as a function of temperature.

Yet further, the red LEDs used also have a very significant drop-off in light output with age. After a few years of operation, their light output has become significantly reduced, and the amount of that reduction is different than that of the green or blue LEDs used together with the red to produce the white light. To compensate for this, a light sensor is sometimes built in to the light to detect the light's spectral characteristics, and adjust the red LEDs' current to compensate for this aging. The light sensor can also be used to adjust the red LEDs' current to achieve the desired CCT as a function of dim level. The light sensor further adds cost and size to the design of the light, and the temperature measurement and correction of the red LEDs' drive current further add to the complexity of the firmware used by the microcontroller.

It would be desirable to have an LED system that could be dimmed in such a way as to emulate the light output of an incandescent bulb, both in brightness and in CCT, when operated on either a triac or 0-10V dimmer. It would be desirable that it would be insensitive to temperature variation and aging, and that it would be easy to control without the use of a microcontroller or a spectral sensor. It would also be desirable that it would be inexpensive, and that it not require the use of three or more different types of LEDs.

SUMMARY

In one or more embodiments, a circuit uses a number of white LEDs of approximately 3000K CCT, plus a smaller number of deep red LEDs with an emission spectrum of approximately 650 nm, or more generally ranging in wavelength from 630 nm up to the limits of visibility. It provides for controlling the current to the two types of LEDs when used with a dimmer in such a way as to emulate both the brightness and CCT of an incandescent light used on that dimmer. It also provides for being insensitive to temperature variations and aging, does not require the use of either a spectral sensor or a microcontroller, and is small and inexpensive.

In one or more embodiments, a current drive is provided to the white LEDs, with the current being controlled by the dim level. The current drive may be, for example, a controllable constant current sink. In another embodiment, the current drive may be a switch-mode power supply (SMPS). The control may be either an average line voltage or an externally sourced DC voltage such as 0-10V. In an embodiment, the average line voltage is determined by an RC filter attached to the output of the bridge. In some embodiments, a current drive is provided to the deep red LEDs, with the current being controlled by the dim level. In an embodiment, the current drive for the deep red LEDs may be a SMPS. The control used may be the same control as that used for the white LEDs.

In one or more embodiments, the current to the white LEDs is proportional to the dim level, so that, for example, when the dimmer is at maximum, the current to the white LEDs is maximum, and when the dimmer is at 60%, the current to the white LEDs is also 60%. The current to the deep red LEDs is also dependent on the dim level, but additionally has a saturation value and may have a minimum level. In an embodiment, the current to the deep red LEDs is saturated at maximum when the dimmer is at maximum, and the current remains saturated at maximum while the dimmer is lowered to 60%. When the dimmer is below 60%, the current to the deep red LEDs is proportional to the further drop of the dimmer level, so that, for example, when the dimmer is at 30%, the current to the deep red LEDs is at 65%, and when the dimmer is close to 0%, the current to the deep red LEDs is at a minimum level of 35%. The specific numbers used are dependent on the particular light output and number of LEDs used for both the white and the deep red LEDs.

As an example, at dimmer maximum, both the white and the deep red LEDs are on at maximum current. In one embodiment, the ratio of the number of white LEDs to the number of deep red LEDs may be selected such that this combination produces white light of a CCT of approximately 2700K. At 60% setting of the dimmer, the white LEDs are at 60% of their maximum current, while the deep red LEDs are still at their maximum current. This produces a white light of CCT of approximately 2630K, closely matching that of an incandescent light at 60% dim level. At 5% setting of the dimmer, the white LEDs are at 5% of their maximum current, while the deep red LEDs are at 35% of their maximum current. This produces a reddish light of CCT of approximately 1800K, close to that of an incandescent at 5% dim level. The particular CCT as a function of dim level may be designed by selecting the brightness and drive level compatible with the particular white and deep red LEDs selected.

Such embodiments are, for example, insensitive to variations in temperature and aging, as the deep red LEDs, unlike amber or red LEDs, have little variation in light output with either. Thus, neither a spectral sensor nor a microcontroller is required, and these embodiments can be is thus both small and inexpensive.

BRIEF DESCRIPTION OF THE DRAWINGS

The accompanying drawings are included to provide a further understanding of the disclosure, and are incorporated in and constitute a part of this specification.

DETAILED DESCRIPTION

Figure 1:
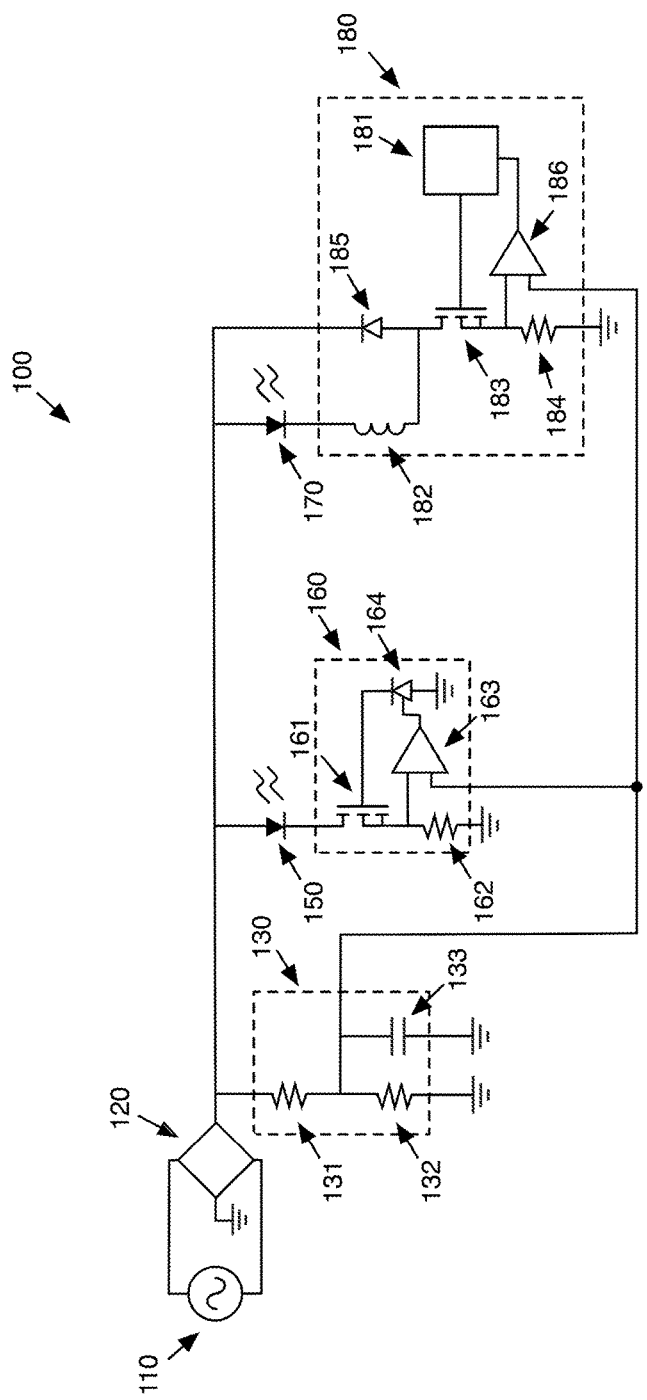
FIG. 1 is a diagram of an LED warm-on-dim circuit controlled by the average line voltage, according to an embodiment.

Reference will now be made in detail to the various embodiments, examples of which are illustrated in the accompanying drawings. Wherever possible, the same reference numbers are used in the drawings and the description to refer to the same or like parts.

According to the design characteristics, a detailed description of the embodiments is given below.

FIG. 1 is a diagram of an LED warm-on-dim circuit 100 controlled by the average line voltage, according to an embodiment. As shown in FIG. 1, the AC line 110 is rectified by a diode bridge 120. The average line voltage may be determined by a filter 130, if a DC dimming signal is not present. The filter 130 consists of two resistors 131 and 132 connected between the output of the diode bridge 120 and ground that divide down the rectified voltage, and a capacitor 133 that averages the divided down voltage. In an embodiment, the time constant of the filter 130 may be at least several times the period of the AC line 110.

Also attached to the output of the diode bridge 120 is a set of white LEDs 150. These may be a series string or parallel combination of LEDs 150, or a parallel set of series strings of white LEDs 150. The set of white LEDs 150 have their current controlled by a controllable current sink 160. The controllable current sink 160, for example, includes a transistor 161, a current sense resistor 162, a control opamp circuit 163 and a shunt reference 164. The transistor 161 passes current from the set of white LEDs 150, through the current sense resistor 162 to ground. The current sense resistor 162 produces a voltage proportional to the current from the set of white LEDs 150. The control opamp circuit 163 has as inputs the voltage from the current sense resistor 162 and the voltage from the filter 130. The output of the control opamp circuit 163 produces a voltage that controls the shunt reference 164. In operation, the output of the opamp circuit 163 is equal to a fixed gain, times the difference in voltage between the current sense resistor 162 and the filter 130. The gain of the opamp circuit 163 is set high. This forces the voltage across the current sense resistor 162, and thus the current through the white LEDs 150, to be nearly equal to the voltage from the filter 130, and thus to the average line voltage.

Also attached to the output of the diode bridge 120 is a set of deep red LEDs 170. This may be a single LED 170 or a series string or parallel combination of LEDs 170, or a parallel set of series strings of deep red LEDs 170. The set of deep red LEDs 170 have their current controlled by a controllable SMPS 180. The controllable SMPS 180, for example, may be buck-derived, consisting of a controller 181, an inductor 182, a transistor 183, a current sense resistor 184, a rectifier diode 185 and a control opamp circuit 186. The controller 181 turns on the transistor 183. With the transistor 183 on, the current in the inductor 182 increases. The current in the inductor 182 comes from the deep red LED 170, goes through the transistor 183 and thence through the current sense resistor 184 to ground. The current sense resistor 184, in response to the current, develops a voltage proportional to the inductor 182 and deep red LED 170 current. The controller 181 compares the voltage developed across the current sense resistor 184 with a reference voltage. When the voltage developed across the current sense resistor 184 is equal to the reference voltage, the controller 181 turns off the transistor 183. With the transistor 183 off, the current in the inductor 182 goes through the rectifier diode 185 and decreases. The entire cycle then repeats, either at a constant frequency or with constant off-time, or with other known control schemes. The result is that to a first approximation, the current in the inductor 182 and the deep red LEDs 170 is constant.

The reference voltage for the controller 181 is generated by the control opamp circuit 186. The control opamp circuit 186 has as inputs the voltage from the current sense resistor 184 and the voltage from the filter 130. The output of the control opamp circuit 186 produces a voltage that generates or controls the reference voltage for the controller 181. The output of the control opamp circuit 186 has a saturation value and may have a minimum level. In some instances, the output of the opamp circuit 186 may be saturated at its maximum voltage when the filter 130 voltage is at maximum, and this output remains saturated at maximum until the filter 130 voltage lowers to a particular value, such as 60% of maximum. When the filter 130 voltage is lower than this particular value, such as below 60%, the output of the opamp circuit 186 may be proportional to the further drop of the filter 130 voltage. In some instances, when the filter 130 voltage reaches zero or close to zero, the output of the opamp circuit 186 may remain at some minimum level, such as 35%.

In operation, the output of the opamp circuit 186 is equal to a fixed gain, times the voltage of the filter 130 plus a reference voltage. The gain may be less than one, in which case it may be formed in part by a resistor divider, not shown. As long as the filter 130 voltage is above a particular value, such as above 60%, the sum of the filter 130 voltage plus the reference voltage is large enough that the output of the opamp circuit 186 is at its maximum. In an embodiment, this maximum is set by the power supply voltage of the opamp circuit 186. This causes the SMPS 180 to produce maximum current through the set of deep red LEDs 170. When the filter 130 voltage is linearly decreased below this particular value, the output of the opamp circuit 186 linearly decreases. This causes the SMPS 180 to produce linearly less current through the set of deep red LEDs 170.

As a result of these two control systems, the controllable current sink 160 and the SMPS 180, the set of white LEDs 150 and the set of deep red LEDs 170 together produce light that, both at full brightness and when dimmed, emulates the brightness and CCT of an incandescent light when it is respectively at full brightness or dimmed.

Figure 2:
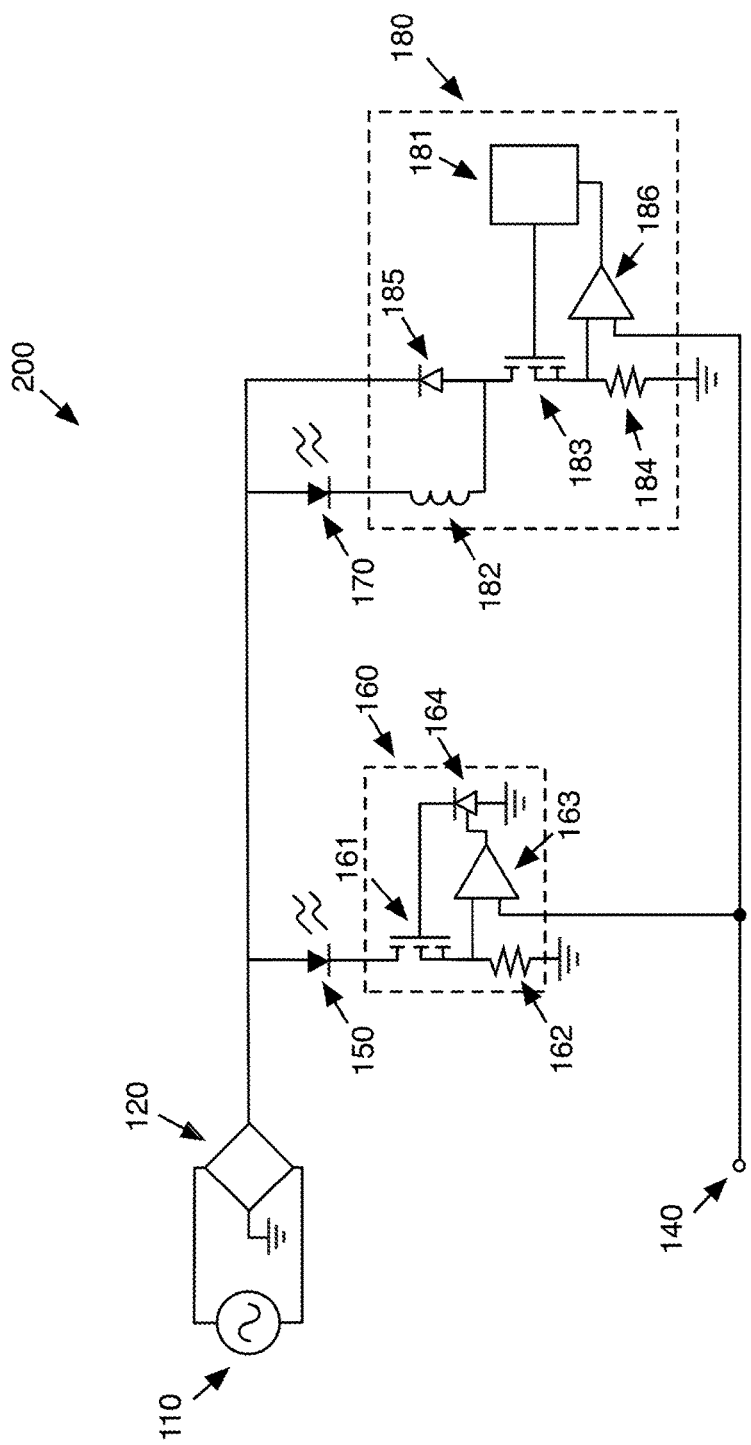
FIG. 2 is a diagram of an LED warm-on-dim circuit controlled by a 0-10V dim signal, according to another embodiment.

FIG. 2 is a diagram of an LED warm-on-dim circuit 200 controlled by a 0-10V dim signal 140, according to an embodiment. As shown in FIG. 2, the 0-10V dim signal 140 now forms the reference voltage for both the opamp 163 controlling the brightness of the white LEDs 150, and also for the opamp 186 controlling the brightness of the deep red LEDs 170. The 0-10V dim signal 140 may be, for example, divided down by a resistor divided, not shown, to form a signal of comparable amplitude to the voltage on the current sense resistors 162 and 184.

Figure 3:
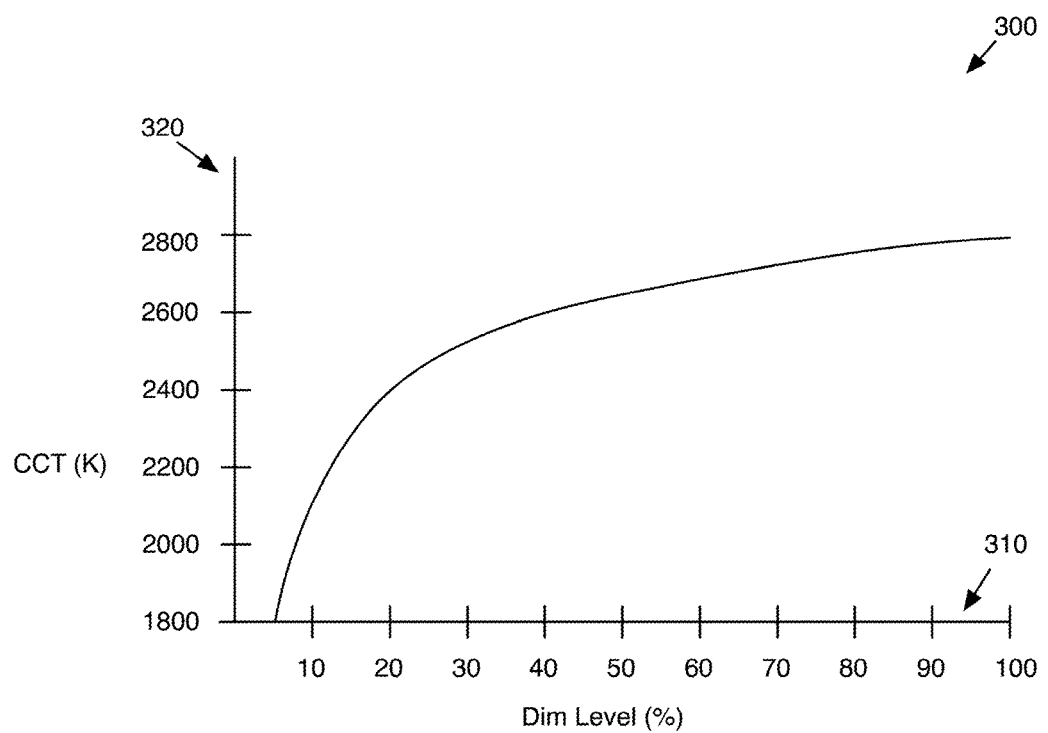
FIG. 3 is an example of a diagram of the CCT vs. dim level of an LED warm-on-dim circuit.

FIG. 3 is an example of a diagram of the CCT vs. dim level of an LED warm-on-dim circuit 100. As shown in FIG. 3, the x-axis 310 shows the average of the line voltage of the AC line 110 rectified by a diode bridge 120. The x-axis 310 is marked in terms of percentage of full voltage. As the line voltage is dimmed, the average decreases, corresponding to more leftwards positions on the x-axis 310. The y-axis 320 shows the CCT of the LED warm-on-dim circuit 100. The y-axis 320 is marked in terms of degrees Kelvin (K).

At the maximum setting of the dimmer, shown on the far right of the x-axis 310, the CCT is at approximately 2800K. As the setting of the dimmer is decreased, the CCT approximately linearly decreases, until the setting is approximately 40%, at which point the CCT has decreased to approximately 2600K. As the dimmer is further decreased, the CCT begins to drop more quickly. By the time it reaches 5%, the CCT has dropped to approximately 1800K. This CCT vs. dim level graph 300 closely matches that of an incandescent light on a dimmer.

Figure 4:
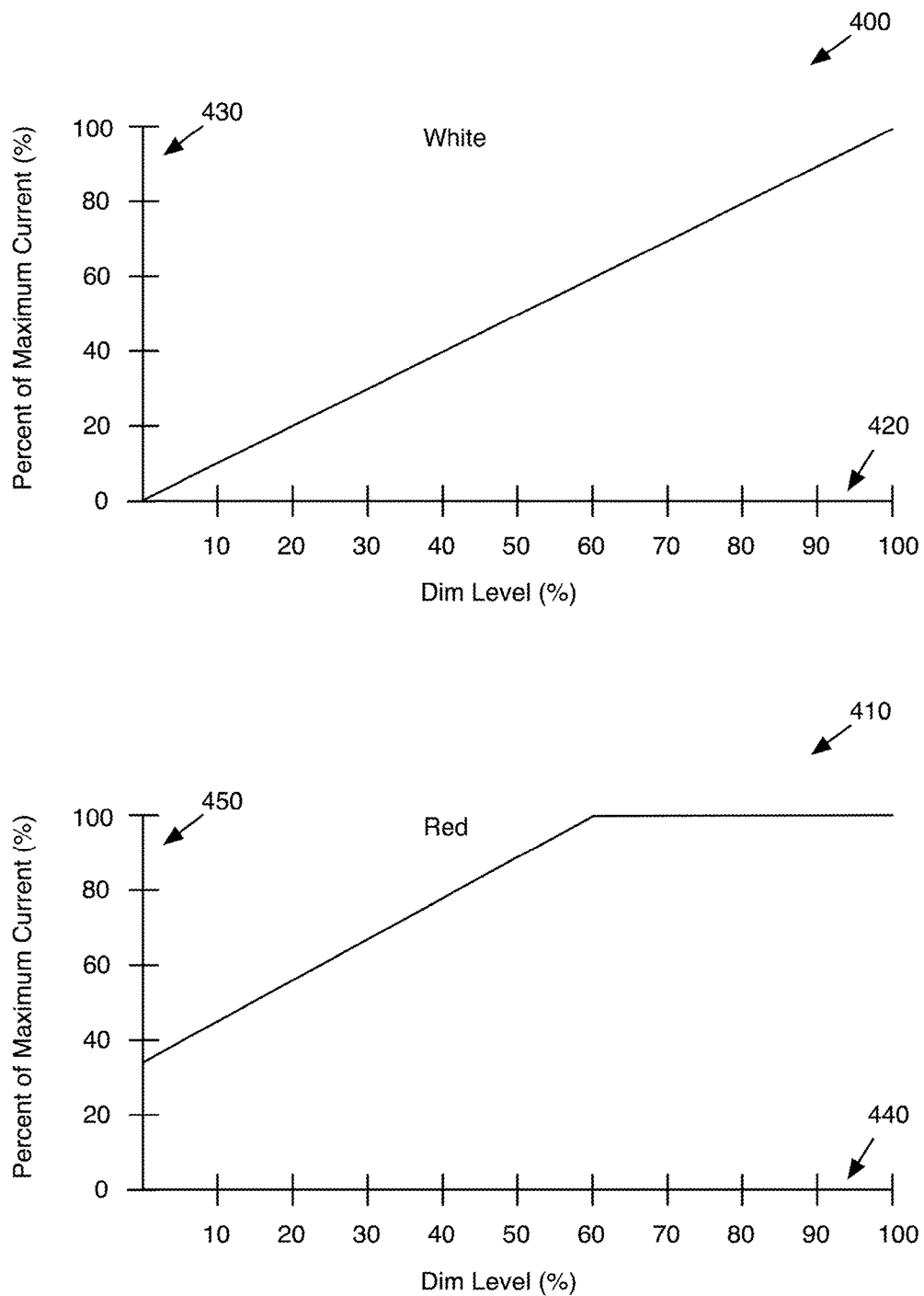
FIG. 4 is an example of a diagram of the drive current to the white and deep red LEDs in an LED warm-on-dim circuit.

FIG. 4 is an example of a diagram 400 of the drive current to the white LEDs 150 and a diagram 410 of the drive current to the deep red LEDs 170 in an LED warm-on-dim circuit 100 or in an LED warm-on-dim circuit 200. As shown in FIG. 4, the x-axis 420 of the diagram 400 of the drive current to the white LEDs 150 shows the average of the line voltage of the AC line 110 rectified by a diode bridge 120. The x-axis 420 is marked in terms of percentage of full voltage. The y-axis 430 shows the percentage of maximum current of the white LEDs 150 of the LED warm-on-dim circuit 100 or of the LED warm-on-dim circuit 200. At the maximum setting of the dimmer, shown on the far right of the x-axis 420, the current is approximately 100% of maximum. As the setting of the dimmer is decreased, the current approximately linearly decreases, down to approximately zero at a dimmer setting at or close to zero percent of full line voltage.

The x-axis 440 of the diagram 410 of the drive current to the deep red LEDs 170 shows the average of the line voltage of the AC line 110 rectified by a diode bridge 120. The x-axis 440 is marked in terms of percentage of full voltage. The y-axis 450 shows the percentage of maximum current of the deep red LEDs 170 of the LED warm-on-dim circuit 100 or of the LED warm-on-dim circuit 200. At the maximum setting of the dimmer, shown on the far right of the x-axis 440, the current is approximately 100% of maximum. As the setting of the dimmer is decreased down to approximately 60%, the current remains at approximately 100% of maximum. As the setting of the dimmer is further decreased beyond 60%, the current approximately linearly decreases. When the dimmer is decreased to almost 0%, the current is reduced to approximately 35%.

It will be apparent to those skilled in the art that various modifications and variation can be made to the disclosed embodiments. In view of the foregoing, it is intended that the disclosure cover modifications and variations of the disclosed embodiments.

What is claimed is:

1. A light emitting diode (LED) dimmer circuit, comprising:
   at least one white LED;
   a first controllable current source coupled to the at least one white LED and configured to produce a current that increases linearly as a dimming level increases;
   at least one deep red LED; and
   a second controllable current source coupled to the at least one deep red LED and configured to produce a current that increases linearly as the dimming level increases, the dimming level having a maximum level.

2. The LED dimmer circuit of claim 1, further comprising:
   a first controllable current circuit coupled to the at least one white LED, the first controllable current circuit having a resistor; and
   a second controllable current circuit coupled to the at least one deep red LED, the second controllable current circuit having a resistor.

3. The LED dimmer circuit of claim 1, further comprising:
   a first controllable current circuit coupled to the at least one white LED, the first controllable current circuit having a resistor that is configured to produce a voltage proportional to a current for the at least one white LED; and
   a second controllable current circuit coupled to the at least one deep red LED, the second controllable current circuit having an inductor and a resistor that is configured to produce a voltage proportion to the current for the at least one deep red LED.

4. The LED dimmer circuit of claim 1, further comprising:
a first controllable current circuit coupled to the at least one white LED, the first controllable current circuit having a resistor; and
a second controllable current circuit coupled to the at least one deep red LED, the second controllable current circuit having a resistor and a controller operatively coupled to the resistor of the second controllable current circuit, the controller configured to decrease the current for the at least one deep red LED in response to a voltage across the resistor of the second controller current circuit being substantially equal to a reference voltage.

5. The LED dimmer circuit of claim 1, further comprising:
a first controllable current circuit coupled to the at least one white LED, the first controllable current circuit having a resistor; and
a second controllable current circuit coupled to the at least one deep red LED, the second controllable current circuit having a resistor and a controller operatively coupled to the resistor of the second controllable current circuit, the controller configured to decrease the current for the at least one deep red LED in response to a voltage across the resistor of the second controller current circuit being substantially equal to a reference voltage received from an external source.

6. The LED dimmer circuit of claim 1, further comprising:
a first controllable current circuit coupled to the at least one white LED, the first controllable current circuit having a resistor; and
a second controllable current circuit coupled to the at least one deep red LED, the second controllable current circuit having a resistor and an opamp circuit operatively coupled to the resistor of the second controllable current circuit, the opamp circuit having a saturation value associated with the maximum level, the maximum level being for the at least one deep red LED.

7. The LED dimmer circuit of claim 1, further comprising:
a first controllable current circuit coupled to the at least one white LED, the first controllable current circuit having a resistor; and
a second controllable current circuit coupled to the at least one deep red LED, the second controllable current circuit having a resistor and an opamp circuit operatively coupled to the resistor of the second controllable current circuit, the opamp circuit having a saturation value associated with the maximum level for the at least one deep red LED, the opamp circuit configured to produce a linear dimming level in response to the opamp circuit having a voltage less than the saturation value.

8. An apparatus, comprising:
at least one white light emitting diode (LED);
a first controllable current circuit coupled to the at least one white LED, the first controllable current circuit having a resistor, the first controllable current circuit configured to receive a first current and produce a second current that increases linearly as a dimming level increases;
at least one deep red LED; and
a second controllable current circuit coupled to the at least one deep red LED, the second controllable current circuit having a resistor, the second controllable current circuit configured to receive the first current and produce a third current that increases linearly as the dimming level increases, the dimming level having a maximum level.

9. The apparatus of claim 8, wherein:
the resistor of the first controllable current circuit is configured to produce a voltage proportional to the second current; and
the second controllable current circuit has an inductor, the resistor of the second controllable current circuit is configured to produce a voltage proportion to the third current.

10. The apparatus of claim 8, wherein:
the second controllable current circuit has a controller operatively coupled to the resistor of the second controllable current circuit, the controller is configured to decrease the third current in response to a voltage across the resistor of the second controller current circuit being substantially equal to a reference voltage.

11. The apparatus of claim 8, wherein:
the second controllable current circuit has an opamp circuit operatively coupled to the resistor of the second controllable current circuit, the opamp circuit has a saturation value associated with the maximum level, the maximum level being for the at least one deep red LED.

12. The apparatus of claim 8, wherein:
the second controllable current circuit has an opamp circuit operatively coupled to the resistor of the second controllable current circuit, the opamp circuit has a saturation value associated with the maximum level for the at least one deep red LED, the opamp circuit configured to produce a linear dimming level in response to the opamp circuit having a voltage less than the saturation value.

13. An apparatus, comprising:
at least one white light emitting diode (LED);
a first circuit coupled to the at least one white LED and including a resistor, the first circuit configured to produce a current that increases linearly as a dimming level increases;
at least one deep red LED; and
a second circuit coupled to the at least one deep red LED and including a resistor, the second circuit configured to produce a current that increases linearly as the dimming level increases, the dimming level having a maximum level.

14. The apparatus of claim 13, wherein:
the resistor of the first circuit is configured to produce a voltage proportional to the current for the at least one white LED; and
the second circuit has an inductor, the resistor of the second circuit is configured to produce a voltage proportion to the current for the at least one deep red LED.

15. The apparatus of claim 13, wherein:
the second circuit has a controller operatively coupled to the resistor of the second circuit, the controller is configured to decrease the current for the at least one deep red LED in response to a voltage across the resistor of the second circuit being substantially equal to a reference voltage.

16. The apparatus of claim 13, wherein:
the second circuit has an opamp circuit operatively coupled to the resistor of the second circuit, the opamp circuit has a saturation value associated with the maximum level, the maximum level being for the at least one deep red LED.

17. The apparatus of claim 13, wherein:
the second circuit has an opamp circuit operatively coupled to the resistor of the second circuit, the opamp circuit has a saturation value associated with the maximum level, the maximum level being for the at least one deep red LED, the opamp circuit configured to produce a linear dimming level in response to the opamp circuit having a voltage less than the saturation value.

18. The apparatus of claim 13, wherein the first circuit is at least one of a controllable linear regulator or a controllable switch-mode power supply.

19. The apparatus of claim 13, wherein the second circuit is at least one of a controllable linear regulator or a controllable switch-mode power supply.

20. The apparatus of claim 13, wherein:
the first circuit is at least one of a controllable linear regulator or a controllable switch-mode power supply, and
the second circuit is at least one of a controllable linear regulator or a controllable switch-mode power supply.

* * * * *